Armstrong & Herring,
Water Wheel.

N°. 4,963.   Patented Feb. 9, 1847.

UNITED STATES PATENT OFFICE.

JAMES ARMSTRONG AND HARDY HERRING, OF NEAR LISBON, NORTH CAROLINA.

IMPROVEMENT IN WATER-WHEELS.

Specification forming part of Letters Patent No. 4,963, dated February 9, 1847.

*To all whom it may concern:*

Be it known that we, JAMES ARMSTRONG and HARDY HERRING, of Near Lisbon, in the county of Sampson and State of North Carolina, have invented a new and useful Improvement in the Construction of Reaction Water-Wheels, which is described as follows, reference being had to the annexed drawings of the same, making part of this specification.

Figure 1:
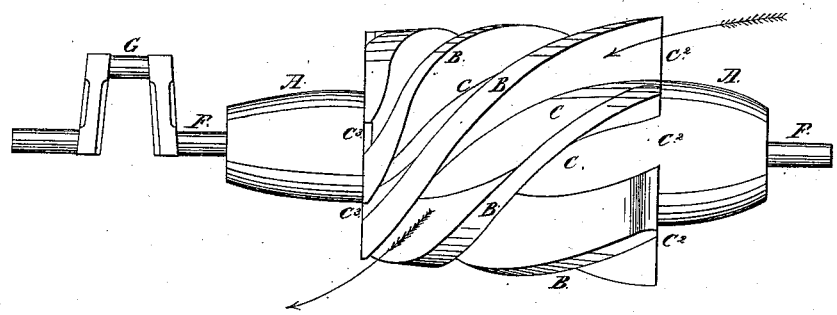
Figure 2:
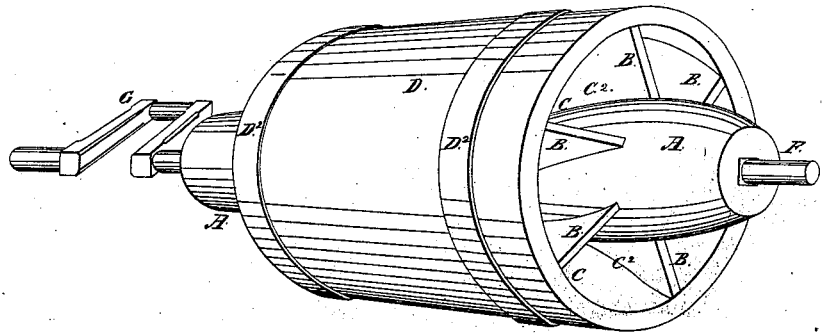
Figure 3:
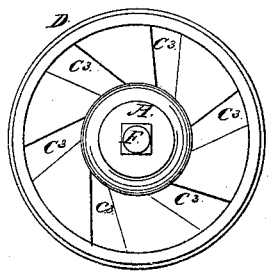

Figure 1 is a side view of the wheel and crank-shaft, the hollow frustum of a cone-case surrounding the spiral buckets and attached thereto being removed in order to show the shape of the buckets and the spiral water-courses between them. Fig. 2 is a perspective view of the wheel, the case being in the proper place. Fig. 3 is a view of the end of the wheel in which the issues are formed.

A is the core of the wheel, made in the shape of a solid frustum of a cone. B are the spiral buckets surrounding or winding around said cone in spiral lines. C are the spaces or water-courses between said buckets. $C^2$ are the inlets. $C^3$ are the issues. D is a hollow case made in the shape of a hollow frustum of a cone, encircling said buckets and secured to the outer edges of the same by any suitable means, said case being banded by iron bands $D^2$ to strengthen it. F is the shaft. G is a crank on the shaft.

The buckets are of the same width throughout their entire length spirally, but are not of the same thickness, being made much thinner at the inlet, or where the water is admitted, than at the outlets, or where the water is discharged, for the purpose of gradually decreasing the width of the water-courses between the buckets from the inlets to the outlets by which the water becomes condensed in said water-courses and is caused to discharge in small streams with great effect, the wheel turning in a contrary direction to that in which the water escapes, as in all reaction water-wheels, and not requiring more than one-half the quantity of water than is required to turn the "Hotchkiss" and other wheels in use to produce a given amount of work.

The end of the core of the wheel next the inlets is made rounded or spherical, so as not to impede the water or interfere with its free passage to the aforesaid spiral water-courses.

We do not claim combining a cone, conical hoop, and curved floats, nor of surrounding spiral buckets on a conical hub by a conical hoop; but

What we claim as our invention, and desire to secure by Letters Patent, is—

The combination of the frustum of a solid cone A, frustum-of-a-cone hoop D, and spiral wedge-shaped floats C, substantially of the form and in the manner herein set forth, for the purpose of forming a frustum-of-a-cone water-wheel of the precise form and arrangement represented in Figs. 1 and 2, and as described above.

JAMES ARMSTRONG.
HARDY HERRING.

Witnesses:
WM. P. ELLIOT,
ALBERT E. H. JOHNSON.